Nov. 9, 1971
L. R. KELLEY ET AL
3,618,385
FLUIDIC TEMPERATURE SENSOR
Filed June 30, 1966
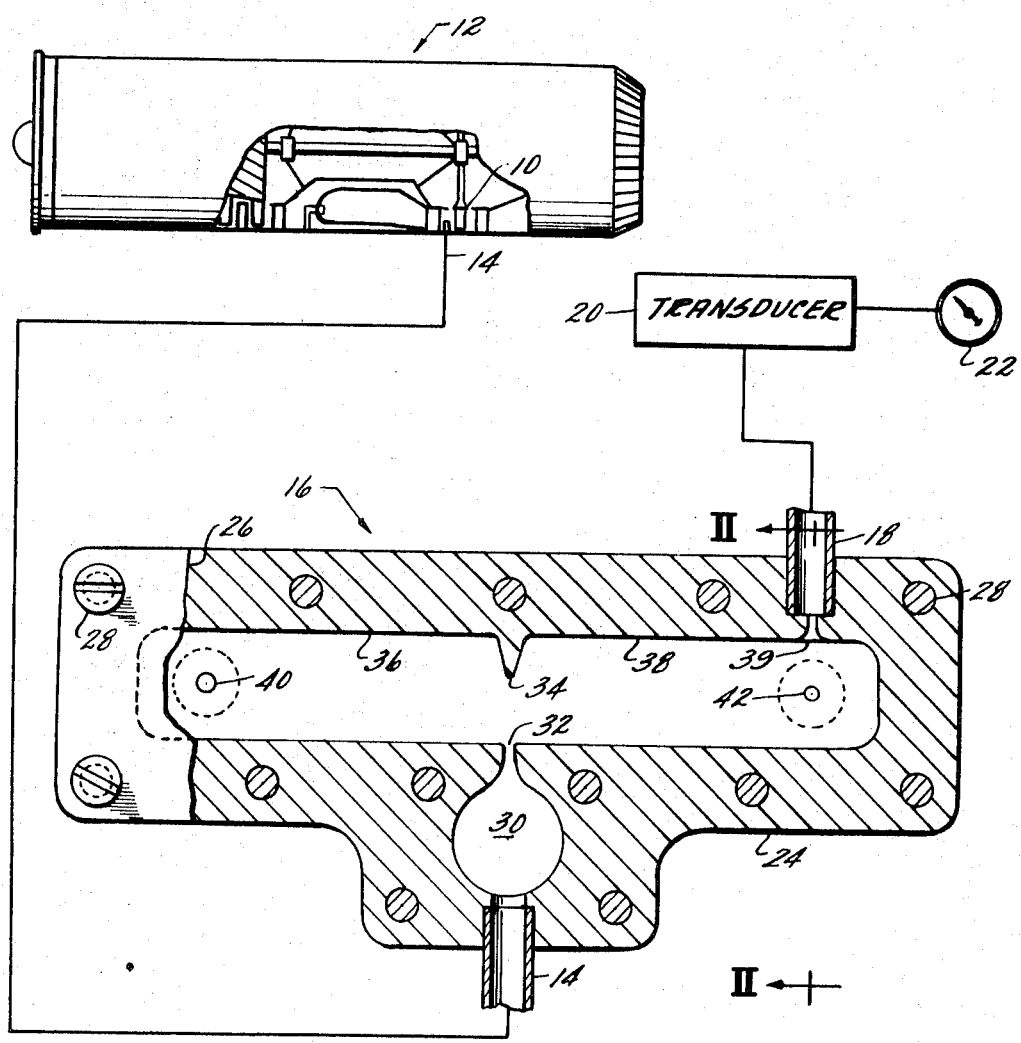
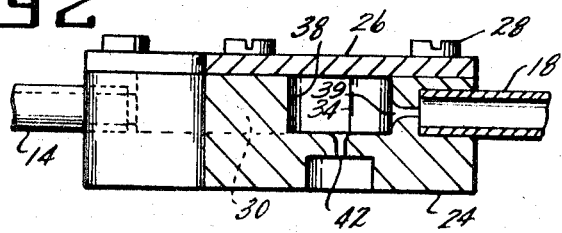
INVENTORS.
LONNY R. KELLEY
FORBES T. BROWN
BY
ATTORNEY

United States Patent Office 3,618,385
Patented Nov. 9, 1971

3,618,385
FLUIDIC TEMPERATURE SENSOR
Lonny R. Kelley, Ballston Lake, N.Y., and Forbes T. Brown, Cambridge, Mass., assignors to General Electric Company
Filed June 30, 1966, Ser. No. 562,450
Int. Cl. G01k 11/22
U.S. Cl. 73—339    5 Claims

ABSTRACT OF THE DISCLOSURE

The disclosure shows a temperature sensor for obtaining a measurement of the temperature of a hot gas stream entering the turbine of a gas turbine engine. The sensor comprises a power nozzle which is connected to the hot gas stream of the engine. The fluid stream discharged from this nozzle impinges on a V-shaped divider spaced outwardly therefrom. The divider causes the power stream to alternately pressurize elongated chambers on opposite sides thereof. These chambers are vented by vents having a combined area approximately one-half the area of the nozzle. An output pressure signal is derived from one of the chambers. The rate at which this pressure signal varies gives an accurate measurement of the temperature of the hot gas stream in the turbine engine. A transducer is employed to provide an analog readout of the measurement.

---

The present invention relates to improvements in fluidic devices employed in sensing the temperature of a hot gas stream.

In recent years there has been a rapid expansion in the development of fluidic devices which are responsive to fluid pressure signals and/or generate fluid pressure signals to carry out both simple and complex control functions. Fluidic devices offer many attractions. For example, they are generally quite reliable because of the lack of moving parts. Also, they are capable of operation under environmental conditions, such as extreme temperatures, which make the use of electronic controls impractical, if not impossible.

One desirable utilization of fluid devices is in sensing the temperature of a gas stream to obtain an analog reading. Such temperature sensings may also be employed to generate a control signal as in a gas turbine engine where it is desired to limit fuel flow when the gas stream temperature exceeds a given value. Several proposals have been made which do, in fact, provide a pressure signal, the frequency of which varies as a function of temperature. Devices embodying such proposals have to a greater or lesser extent been unsatisfactory in that they tend to also vary as a function of the pressure of the gas stream whose temperature is being measured. Temperature indicating signals of such prior devices have usually had frequencies which are extremely high and therefore difficult to convert by transducer means to an analog output or a control signal output. Additional problems have also been encountered in obtaining a sufficiently short response time so that the pressure signal output frequency varies with changes in the gas stream temperature without any undue time lag.

One object of the present invention is to provide a fluidic temperature sensor which will provide a fluid pressure signal output accurately reflecting the temperature of a gas stream over wider pressure ranges of the gas stream.

Another object of the invention is to provide an improved fluidic temperature sensor producing an output pressure signal of relatively low frequency.

Another object of the invention is to provide an improved fluidic temperature sensor which provides a rapid response time to changes in the temperature of a hot gas stream.

The present invention is characterized by a fluidic temperature sensor comprising a pair of longitudinally resonant, tubular cavities separated by a divider. A hot gas stream is introduced through an inlet nozzle which directs a jet towards the divider. The natural instability of this arrangement causes the jet to be alternately directed towards first one and then the other of the two cavities, creating pressure variations therein of a frequency which is a function of the temperature of the gas stream.

It has been found that by providing vent orifices in each of these cavities the frequency of the pressure signal is directly proportional to the square root of the absolute temperature of the gas stream over a wide range of pressures. This increase in accuracy is particularly realized by the preferred relationship wherein the area of the venting orifices is less than the area of the inlet orifice, with best results being obtained by an area ratio of .5/1.

It is further preferred that the venting orifices be disposed in the tubular cavities at points remote from the inlet orifice to provide a maximum flushing of the hot gas stream through the cavities and thereby minimize the response time to changes in the temperature of the gas stream.

The pressure signal thus generated in the cavities may be tapped through an orifice preferably remote from the inlet orifice to provide a maximum output signal strength. The pressure signal thus derived from the temperature sensor may be converted to an analog or control output by the transducer of known design.

The above and other related objects and features of the invention will be apparent from a reading of the following description of the disclosure found in the accompanying drawing and the novelty thereof pointed out in the appended claims.

In the drawing:

FIG. 1 is a view, with portions broken away, of a temperature sensor embodying the present invention and diagrammatically illustrating a system in which it may be incorporated; and FIG. 2 is a section taken on line II—II in FIG. 1.

FIG. 1 illustrates a system in which the present temperature sensor may be employed to provide an analog reading of the temperature of the hot gas stream as it enters the turbine 10 of a gas turbine engine 12. The temperature of the gas stream at this point is extremely high and in many instances a controlling parameter to the operation of the engine. A portion of the gas stream is diverted by a tube 14 to a temperature sensor 16. An output pressure signal is derived from the sensor 16 and fed by a tube 18 to a transducer 20. The output of the transducer 20 is connected to a dial gauge 22 which provides an analog output indicating the temperature of the hot gas stream in the engine 12.

The temperature sensor 16 is conveniently fabricated of a body member 24 having a cap 26 secured thereto by screws 28. The tube 14 is connected to the body member 24 and directs the hot gas stream into a chamber 30 from which it is discharged through an inlet nozzle 32. The hot gas jet from the nozzle 32 is directed against an aligned, symmetrical, V-shaped divider 34 spaced outwardly therefrom. Cavities 36, 38 are disposed on opposite sides of the nozzle 32 and are separated by the divider 32.

Impingement of the gas jet on the divider 34 creates an inherently unstable condition. This results in the gas jet being deflected first towards the cavity 36 until a sufficient pressure is built up to direct the jet into the cavity 38. The cavities 36, 38 are longitudinally resonant and preferably have the same dimensiions relative to each other and to the nozzle 32. These pressure variations thus generated thus provide a pressure signal which is transmitted through an orifice 39 to the tube 18 and then to transducer 20. The frequency of this signal is linearly proportional to the square root of the absolute temperature of the gas stream derived from the engine 12.

It has been found preferable that the cavities 36 and 38 be vented not only by way of the tube 18 but also by venting orifices 40 and 42 in the cavities 36 and 38 respectively. It is further preferable that the combined area of the outlets orifices 39, 40, and 42 be less than the area of the inlet nozzle 32, and advantageously that this ratio be approximately .5/1. These relationships have been found particularly effective in obtaining an accurate pressure signal output from the temperature sensor even though the pressure of the hot gas stream in tube 14 varies by as much as 40/1. Of particular significance is the fact that the increase in workable pressure ranges enables operation of the temperature sensor at relatively low pressures. Such low pressure operation is particularly desirable, if not an absolute necessity, in obtaining temperature readings and/or controlling operation of a gas turbine engine as a function of temperature, since the pressure of the hot gas stream can and does fall to a relatively low level under certain engine operating conditions.

It will further be noted that the vents 40, 42 and to a lesser extent 39 function to flush hot gas from the chambers 36 and 38. Thus, as the temperature of the gas stream varies, the temperature of the gas resonating within the cavities 36 and 38 likewise varies causing a frequency shift which, as was pointed out, is directly proportional to the square root of the absolute temperature of the gas stream. Because of the flushing action a minimum response time is required to have the change in temperature reflected at the output reading on dial 22. It will also be noted that the vents 40 and 42 are located remote from the inlet nozzle 32 to obtain a maximum flushing action. The vent orifice 39 is disposed remote from the inlet orifice 32 for this reason and for the further reason that at this point a maximum amplitude pressure signal is generated.

The divider 34 is spaced from the inlet nozzle 32 a distance sufficient that the hot gas jet discharged therefrom is not throttled and is formed on a relatively acute angle to insure a condition of instability which will insure the desired condition of instability. It is also preferable that the inlet nozzle 32 be of a rectangular cross section inasmuch as a flat gas jet has been found preferable for reliable operation.

The cavities 36 and 38 may vary in dimensions and proportions up to the point that they remain longitudinally resonant tubes. That is to say they could be of circular as well as rectangular cross section, and they could be longer or shorter than shown herein. The length of the tubes determines the frequency of the output signal and enables a rough predetermination of the operating frequency for the transducer 20.

From the above it will be apparent that various departures from the preferred embodiment herein described will fall within the scope of the present inventive concepts which are to be derived from the following claims.

Having thus described the invention, what is claimed as novel and desired to be secured by Letters Patent of the United States is:

1. A fluid temperature sensor comprising,
   an inlet nozzle from which a hot gas stream is to be discharged,
   a pair of resonant, longitudinally tubular cavities respectively located on opposite sides of the discharge from said nozzle, said cavities having a substantially constant cross-sectional area,
   a divider between said cavities, said divider being spaced from said inlet nozzle discharge and disposed symmetrically thereof,
   whereby the hot gas jet will alternately pressurize first one and then the other of said cavities,
   means for deriving an output pressure signal from one of said cavities, and
   means for venting said cavities.

2. A fluidic temperature sensor as in claim 1 wherein,
   the means for venting said cavities are disposed at points remote from said inlet nozzle.

3. A fluidic temperature sensor as in claim 1 wherein,
   the area of the venting means is less than the area of the inlet nozzle.

4. A fluidic temperature sensor as in claim 1 wherein,
   the inlet nozzle is of rectangular cross section and the divider is in the form of a V-shaped element having a relatively small included angle,
   said cavities have a common axis normal to the nominal flow of gas from said inlet nozzle, and
   further wherein the means for venting each of said cavities are disposed at points remote from said inlet nozzle and have an area less than that of the inlet nozzle.

5. A fluidic temperature sensor as in claim 4 wherein,
   the area of the venting means is approximately one-half the area of the inlet nozzle.

References Cited
UNITED STATES PATENTS

| | | | |
|---|---|---|---|
| 3,025,670 | 3/1962 | Russ | 73—357 X |
| 3,314,294 | 4/1967 | Colston | 73—357 |
| 3,158,166 | 11/1964 | Warren | 137—81.5 |
| 3,185,166 | 5/1965 | Horton et al. | 137—81.5 |

VERLIN R. PENDEGRASS, Primary Examiner

U.S. Cl. X.R.

73—357